UNITED STATES PATENT OFFICE.

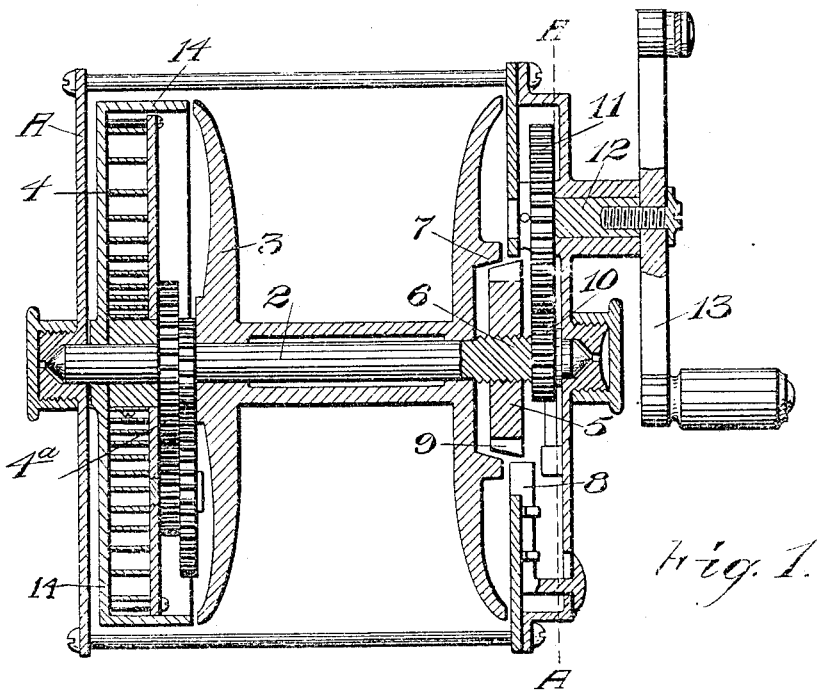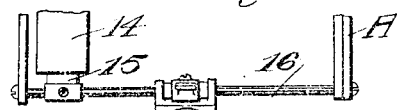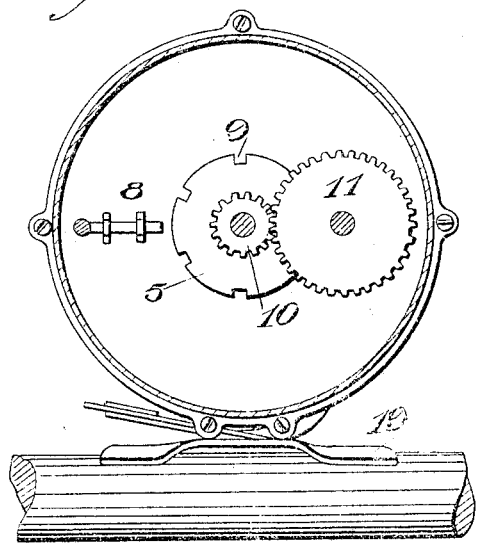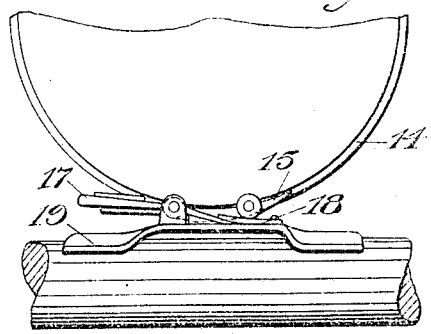

WILLIAM ERNST AND ALVA A. PATTON, OF SAN FRANCISCO, CALIFORNIA.

FISHING-REEL.

No. 818,880.   Specification of Letters Patent.   Patented April 24, 1906.

Application filed June 28, 1905. Serial No. 267,358.

*To all whom it may concern:*

Be it known that we, WILLIAM ERNST and ALVA A. PATTON, citizens of the United States, residing in the city and county of San Francisco and State of California, have invented new and useful Improvements in Fishing-Reels, of which the following is a specification.

Our invention relates to improvements in fishing-reels.

It consists in the combination of parts whereby the reel may be rendered automatic or by means of a friction-clutch the spool may be rendered free from or turnable with the shaft.

It also comprises details of construction which will be more fully explained by reference to the accompanying drawings, in which—

Figure 1 is a longitudinal section of our invention. Fig. 2 is a section on the line A A. Fig. 3 is an end view of our braking mechanism. Fig. 4 is a side view of the same.

The reel consists of a suitable frame A, within which the shaft 2 is centrally journaled, extending between the disks which form the ends of the frame. Upon this shaft is loosely turnable a spool 3, upon which the line is coiled.

4 is a spring, and 4ª is a train of gearing so connected with the spring and with the shaft 2 that the line may be uncoiled from the spool and through the gearing will act to coil the spring and increase its tension, and when the strain upon the line is less than the tension of the spring the latter will act to again recoil the line.

5 is a clutch-ring turnable upon a screw-threaded portion 6 of the shaft and movable, so that when advanced along its screw-thread toward the end of the spool it will engage with the internal cone 7 at the end of the spool and will thus lock the spool to the shaft. If it is desired to disengage this spool and allow it to turn independently of the clutch, the latter is moved outwardly, thus disengaging it from the spool-cone. This movement of the clutch-disk 5 may be effected by means of a sliding pawl 8, which is movable radially with relation to the clutch 5, and which by being pressed inwardly is made to engage with a notch in this clutch, there being a series of such notches around the periphery, as shown at 9. Thus the part 5 being temporarily held stationary will advance to either engage and lock the spool or be disengaged therefrom.

The brake consists of a segment 15, fulcrumed upon the transverse bar 16, which has its ends journaled in the end disks of the frame A. The segment lies beneath the casing 14. A lever 17 is conveniently fixed to bar 16, and a spring 18, pressing on the lever, normally holds the brake out of contact with the casing 14. As here shown, the brake-lever is mounted parallel with the clamp 19, which holds the reel to the rod and convenient to be operated by the thumb. When the lever is pressed down, the spring 18 yields and the brake is applied to the casing 14, so as to prevent its rotation. 10 is a pinion fixed upon the shaft 2 at the end opposite to the end which carries the gears 4ª, and this pinion is engaged by a gear 11, mounted upon a journaled stud 12, to the outer end of which is fixed the crank 13. By means of this crank and the intermediate gearing the shaft 2 may be turned, and when the clutch is engaged and the brake 15 applied the spring 4 will be coiled when the line runs out, and the spring 4 acts automatically to again coil the line when the strain on the line slackens.

When the brake is released, the reel and the gearing, spring 4, and casing 14 will turn freely and in unison with the spool and crank-actuated gearing, operating like an ordinary reel. If after a fish is hooked the line continues to run out after the spring 4 is fully coiled, the brake may be manipulated to relieve the strain, and thus check the further run of the fish. When the clutch is disengaged, the spool turns freely upon the shaft 2 and the automatic gearing and its casing stands still. This free turning of the reel allows a long cast to be made in bait-fishing and when a sinker is employed.

The operation will then be as follows: When a cast is to be made, the clutch is disengaged and the reel will then turn freely while a cast is being made and the line will run as far as desired. The brake or drag is then applied to the casing and when a fish is struck and starts to run the gearing will act to coil the spring and the spring and the automatic action of the reel will take place.

Having thus described our invention, what we claim, and desire to secure by Letters Patent, is—

1. The combination in a fishing-reel of a shaft, a spool freely revoluble thereon, a clutch member slidable on the shaft and a companion member fixed to the spool, and a radially-operable member engageable with the shaft clutch member for holding it against rotation whereby the turning of the shaft will engage or disengage the clutch members.

2. In a fishing-reel, a frame, a shaft journaled therein, winding-gear connected with the shaft, a line-holding spool freely turnable upon the shaft, a clutch carried by the shaft said clutch comprising two members both concentric with the shaft and one of said members rotatable with the shaft and also capable of a longitudinal movement relative thereto, and radially-operating means to engage and disengage the movable clutch member with the spool.

3. In a fishing-reel, a frame, a shaft journaled therein, winding-gear connected with the shaft, a line-holding spool freely turnable upon the shaft and carrying a clutch member, a second clutch member carried by and concentric with the shaft, and a radially-operating slide by which said second member is interlocked with the spool member.

4. In a fishing-reel, a frame, a shaft journaled therein, winding-gear connected with the shaft, a line-holding spool freely turnable upon the shaft and carrying a clutch member, a second clutch member having screw-threads and adapted to advance or recede upon corresponding screw-threads on the shaft, engaging devices upon the clutch and a slide movable upon the frame to interlock said device, whereby the turning of the shaft will engage or disengage the clutch members.

5. In a fishing-reel, a frame, a shaft journaled therein, winding-gear and a crank connected with one end of the shaft, gearing fixed to the opposite end of shaft and a coil-spring actuated in unison with said gearing, a casing inclosing the spring and turnable by the shaft, a brake by which the casing may be arrested and the spring independently coiled and a winding-spool turnable upon the shaft and a clutch by which the spool may be connected to turn with the shaft or disengage therefrom.

In testimony whereof we have hereunto set our hands in presence of two subscribing witnesses.

WILLIAM ERNST.
ALVA A. PATTON.

Witnesses:
HENRY P. TRICOU,
S. H. NOURSE.